(12) United States Patent
Couzzi-Carneiro et al.

(10) Patent No.: US 11,085,336 B2
(45) Date of Patent: Aug. 10, 2021

(54) METHOD FOR OPERATING A COMBINED CYCLE POWER PLANT AND CORRESPONDING COMBINED CYCLE POWER PLANT

(71) Applicant: General Electric Company, Schenectady, NY (US)

(72) Inventors: Mariah Couzzi-Carneiro, Baden (CH); Joerg Dietzmann, Baden (CH)

(73) Assignee: General Electric Company, Schenectady, NY (US)

( * ) Notice: Subject to any disclaimer, the term of this patent is extended or adjusted under 35 U.S.C. 154(b) by 172 days.

(21) Appl. No.: 16/228,856

(22) Filed: Dec. 21, 2018

(65) Prior Publication Data

US 2020/0200050 A1    Jun. 25, 2020

(51) Int. Cl.
*F01K 23/10*     (2006.01)
*F02C 6/18*      (2006.01)

(52) U.S. Cl.
CPC .............. *F01K 23/106* (2013.01); *F02C 6/18* (2013.01); *F05B 2260/233* (2013.01)

(58) Field of Classification Search
CPC ....... F01K 23/106; F01K 23/10; Y02E 20/16; F05B 2260/233
See application file for complete search history.

(56) References Cited

U.S. PATENT DOCUMENTS

| | | | |
|---|---|---|---|
| 6,041,588 A * | 3/2000 | Bruckner | F02C 7/224 60/772 |
| 6,427,636 B1 * | 8/2002 | Liebig | F22D 1/12 122/1 B |
| 9,505,986 B2 * | 11/2016 | Iguchi | C10G 3/50 |
| 2004/0011019 A1 * | 1/2004 | Schottler | F01K 23/106 60/39.182 |
| 2004/0025510 A1 | 2/2004 | Schwarzott | |
| 2005/0034445 A1 * | 2/2005 | Radovich | F01K 23/10 60/39.182 |
| 2017/0074504 A1 * | 3/2017 | Drouvot | F22D 1/003 |

* cited by examiner

*Primary Examiner* — Todd E Manahan
*Assistant Examiner* — Thuyhang N Nguyen
(74) *Attorney, Agent, or Firm* — Fletcher Yoder, P.C.

(57) ABSTRACT

A method for operating a combined cycle power plant includes transferring exhaust gas from a gas turbine to a heat recovery steam generator. Further, the method includes preheating condensate before being fed as feedwater to the heat recovery steam generator. Moreover, the method includes reheating the feedwater in the heat recovery steam generator. The method also includes generating steam in the heat recovery steam generator for a steam turbine, wherein preheating the condensate includes monitoring a temperature of the condensate: if the temperature of the condensate is equal to or above a preset temperature, directing the condensate to a low-pressure economizer of the heat recovery steam generator; if the temperature of the condensate is lower than the preset temperature: directing a first fluid from an intermediate source of the low-pressure economizer to heat the condensate.

18 Claims, 4 Drawing Sheets

METHOD FOR OPERATING A COMBINED CYCLE POWER PLANT AND CORRESPONDING COMBINED CYCLE POWER PLANT

BACKGROUND

Embodiments of the disclosure relate generally to a combined cycle power plant, and more particularly relate to a method for operating the combined cycle power plant including a preheating system.

In combined cycle power plants (CCPP), a common combination includes an assembly of a gas turbine (GT), a steam turbine (ST) and a heat recovery steam generator (HRSG). Exhaust heat of the gas turbine is used to generate steam by passing it through the heat recovery steam generator, and the produced steam can be used to drive the steam turbine. HRSGs typically include one or more, for example two or three, pressure stages, and each pressure stage conventionally has a economizer and an evaporator.

When fuel gas/oil with high sulfur (for example, higher than gas odorization levels) is used in the CCPP, the sulfur in the fuel gas/oil will suffer oxidation to $SO_2$ and $SO_3$. In a cold end of the HRSG, the $SO_3$ will react with water generating sulfuric acid which will create corrosion. To avoid the corrosion, it is required to keep a temperature of an inlet feedwater in the HRSG above an acid dew point. Traditionally, this is done by bypassing the feedwater directly to a low-pressure (LP) evaporator drum before entering into the HRSG. From the LP evaporator drum the feedwater will be pumped by a high-pressure and/or intermediate-pressure pump with a correct temperature avoiding acid condensation in a high-pressure and/or intermediate-pressure economizer. However, this concept will be not valid when a booster pump configuration is used, the LP evaporator drum will solve the issue only for a small portion of the feedwater fed therein, a major portion of the feedwater will be pumped directly into the high-pressure and/or intermediate-pressure economizer via the booster pump with a temperature below the acid dew point.

Therefore, it is desirable to provide a new approach to operate the combined cycle power plant to address at least one of the above-mentioned situations.

BRIEF DESCRIPTION

In accordance with one embodiment disclosed herein, a method for operating a combined cycle power plant includes transferring exhaust gas from a gas turbine to a heat recovery steam generator; preheating condensate before being fed as feedwater to the heat recovery steam generator; reheating the feedwater in the heat recovery steam generator; and generating steam in the heat recovery steam generator for a steam turbine. Wherein preheating the condensate comprises: monitoring a temperature of the condensate: if the temperature of the condensate is equal to or above a preset temperature, directing the condensate to a low-pressure economizer of the heat recovery steam generator, wherein the preset temperature is above at least one of a water dew point or an acid dew point; or if the temperature of the condensate is lower than the preset temperature: directing a first fluid from an intermediate source of the low-pressure economizer to heat the condensate. Moreover, if the temperature of the condensate is lower than the preset temperature after heating exchange between the first fluid from the intermediate source and the condensate, directing a second fluid from a hot source of the low-pressure economizer to heating the condensate; if the temperature of the condensate is lower than the preset temperature after heating exchange between the second fluid from the hot source and the condensate, directing at least part of the condensate to an outlet of the low-pressure economizer.

In accordance with another embodiment disclosed herein, a combined cycle power plant includes a gas turbine, a steam turbine, a preheating system and a heat recovery steam generator. The preheating system configured to preheat condensate from the steam turbine as to generator feedwater. The heat recovery steam generator configured to receive exhaust gas from the gas turbine and reheat the feedwater from the preheating system and generating steam for the steam turbine, the heat recovery steam generator comprising a low-pressure economizer and a drum type evaporator. Further, the preheating system includes a feed line, a first control valve and a bypass. The feed line is configured to receive condensate from the steam turbine and direct the feedwater to the low-pressure economizer of the heat recovery steam generator. The first control valve has a first position and a second position, a first channel of the first control valve between an intermediate source of the low-pressure economizer and the feed line is connected in the first position, a second channel of the first control valve between a hot source of the low-pressure economizer and the feed line is connected in the second position. The bypass includes a second control valve and is coupled between an outlet of the low-pressure economizer or the drum type evaporator and the feed line. Wherein, if the temperature of the condensate is equal to or above a preset temperature, both the first control valve and the second control valve are switched off; or if the temperature of the condensate is lower than the preset temperature: the first control valve is turned to the first position to direct a first fluid from the intermediate source to heat the condensate. Moreover, if the temperature of the condensate is lower than the preset temperature after heating exchange between the first fluid from the intermediate source and the condensate, the first control valve is turning to the second position to direct a second fluid from the hot source to heat the condensate; if the temperature of the condensate is lower than the preset temperature after heating exchange between the second fluid from the hot source and the condensate, the second control valve is opened to direct at least part of the condensate from the feed line to the outlet of the low-pressure economizer.

In accordance with yet another embodiment disclosed herein, a preheating system for a heat recovery steam generator is provided, the heat recovery steam generator includes a low-pressure economizer and a drum type evaporator. the preheating system includes a feed line, a first control valve and a bypass. The feed line is configured to receive condensate from a steam turbine and direct feedwater to the low-pressure economizer of the heat recovery steam generator. The first control valve has a first position and a second position, a first channel of the first control valve between an intermediate source of the low-pressure economizer and the feed line is connected in the first position, a second channel of the first control valve between a hot source of the low-pressure economizer and the feed line is connected in the second position The bypass includes a second control valve and is coupled between an outlet of the low-pressure economizer or the drum type evaporator and the feed line. Wherein, if the temperature of the condensate is equal to or above a preset temperature, both the first control valve and the second control valve are switched off; or if the temperature of the condensate is lower than the preset temperature: the first control valve is turned to the first position to direct a first fluid from the intermediate source to heat the condensate. Moreover, if the temperature of the condensate is lower than the preset temperature after heating exchange between the first fluid from the intermediate source and the condensate, the first control valve is turned to the second position to direct a second fluid from the hot source to heat the condensate; if the temperature of the condensate is lower than the preset temperature after heating exchange between the second fluid from the hot source and the condensate, the second control valve is opened to direct at least part of the condensate from the feed line to the outlet of the low-pressure economizer.

DRAWINGS

The accompanying drawings, which are incorporated herein and form part of the specification, illustrate the present disclosure and, together with the description, further serve to explain the principles of the disclosure and to enable a person skilled in the relevant art(s) to make and use the disclosure.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a", and "an" do not denote a limitation of quantity, but rather denote the presence of at least one of the referenced items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. The terms "component", "module", "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer.

Figure 1:
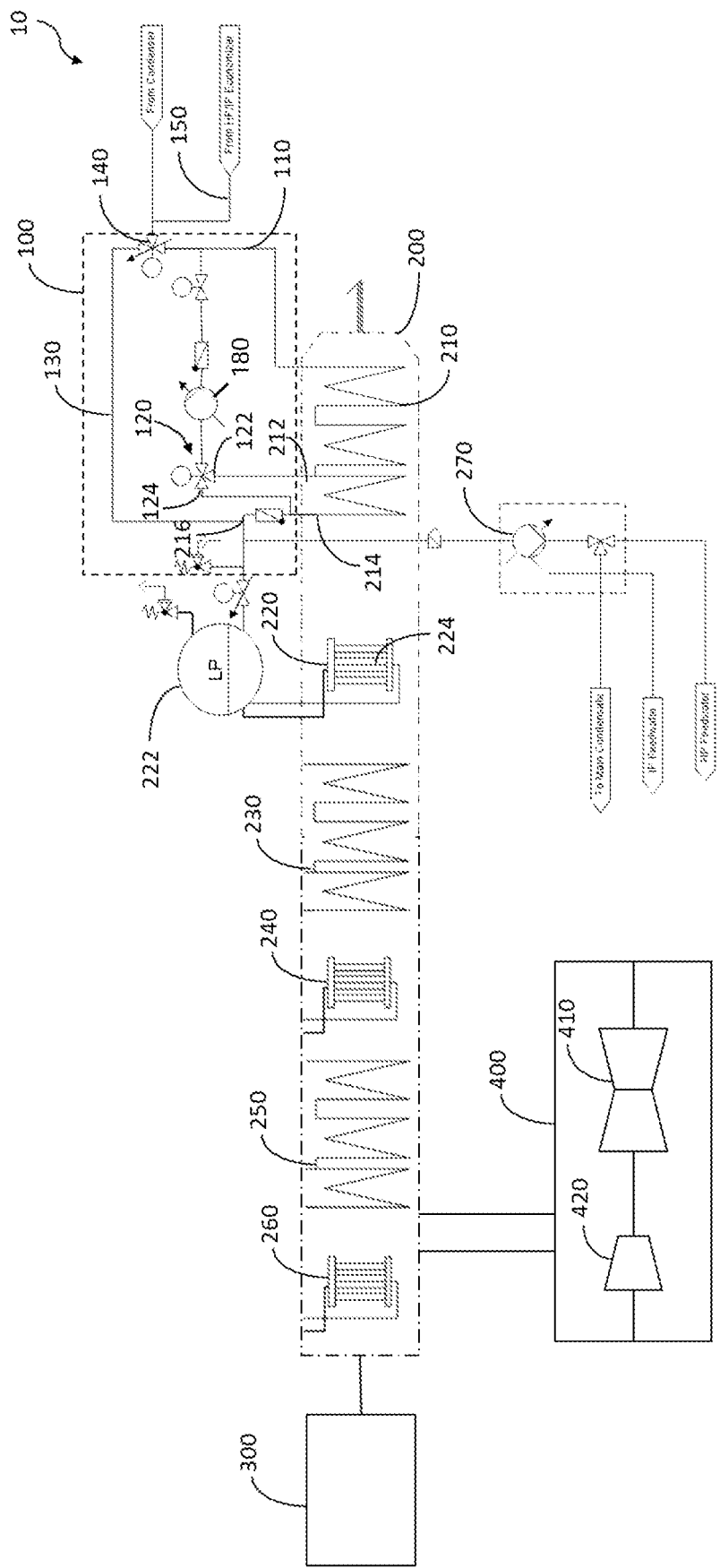
FIG. 1 is a schematic drawing of a combined cycle power plant (CCPP) in accordance with some embodiments of the present disclosure.

FIG. 1 is a schematic drawing of a combined cycle power plant (CCPP) 10. The combined cycle power plant 10 includes a gas turbine 300, a steam turbine 400, a preheating system 100 and a heat recovery steam generator (HRSG) 200. Heat from the gas turbine's exhaust gas is used to generate steam by passing it through the heat recovery steam generator 200, and the steam at high pressure and high temperature is then used in the steam turbine 400. The steam turbine 400 includes a low-pressure (LP) steam turbine 410 and an intermediate pressure (IP) steam turbine 420 coupled to the low-pressure steam turbine 410. The preheating system 100 is configured to preheat condensate from the steam turbine 400 as to generator feedwater for the heat recovery steam generator 200. The heat recovery steam generator 200 is arranged to receive exhaust gas from the gas turbine 300 for reheating the feedwater from the preheating system 100 and generate steam for the steam turbine 400.

The heat recovery steam generator 200 is a multi-pressure heat recovery steam generator, which includes a low-pressure (LP) evaporator 220, an intermediate-pressure (IP) evaporator 240 and a high-pressure (HP) evaporator 260. In some embodiments, the LP evaporator 220 is a drum type evaporator with a drum 222 and an evaporator 224. The heat recovery steam generator 200 also includes a low-pressure (LP) economizer 210, an intermediate-pressure (IP) economizer 230 and a high-pressure (HP) economizer 250 corresponding to the LP evaporator 220, the IP evaporator 240 and the HP evaporator 260, respectively.

In some embodiments, the LP evaporator 220 may generate LP steam to the LP steam turbine 410 and a low-pressure steam control valve 226 is coupled between the LP evaporator 220 of the heat recovery steam generator 200 and the LP steam turbine 410. The IP evaporator 240 may generate IP steam to the IP steam turbine 420 and an intermediate-pressure steam control valve 246 is coupled between the IP evaporator 240 of the heat recovery steam generator 200 and the IP steam turbine 420.

In some embodiments, as shown in FIG. 1, the preheating system 100 includes a feed line 110, a first control valve 120, a recirculation pump 180 and a bypass 130. The feed line 110 is configured to receive condensate from the steam turbine 400 and direct the feedwater to the LP economizer 210 of the heat recovery steam generator 200. The first control valve 120 is a three-way valve having a first position and a second position. A first channel 122 of the first control valve 120 an intermediate source 212 of the low-pressure economizer 210 and the feed line 110 is connected in the first position, and a second channel 124 of the first control valve 120 between a hot source 214 of the low-pressure economizer 210 and the feed line 110 is connected in the second position The recirculation pump 180 is coupled between the first control valve 120 and the feed line 110. The bypass 130 includes a second control valve 140 and is coupled between an outlet 216 of the low-pressure economizer 210 or the drum 222 of the LP evaporator 220 and the feed line 110.

As previously stated fuel gas/oil used to generate the exhaust gas in the CCPP 10 may have a sulfur concentration from about 0 ppm to about 13000 ppm. In order to avoid corrosion caused by the sulfuric acid in the heat recovery steam generator 200, the feedwater for the heat recovery steam generator 200 is required to above a preset temperature, wherein the preset temperature is above at least one of a water dew point or an acid dew point. For example, when the sulfur concentration of the fuel oil is about 500 ppm, the preset temperature is about 80° C., and when the sulfur concentration of the fuel oil is about 13000 ppm, the preset temperature is about 120° C.

In some embodiments, the CCPP 10 may include a temperature sensor (not shown) for monitoring a temperature of the condensate/feedwater before entering the LP economizer 210. If the temperature of the condensate is equal to or above the preset temperature, both the first control valve 120 and the second control valve 140 are switched off, the condensate is directly fed to the LP economizer 210. Otherwise, if the temperature of the condensate is lower than the preset temperature: the first control valve 120 is turned to the first position to direct a first fluid from the intermediate source 212 to the feed line 110 for heating the condensate. Monitoring the temperature of the condensate, if the temperature is lower than the preset temperature after heating exchange between the first fluid from the intermediate source 212 and the condensate, the first control valve 120 is turned to the second position to direct a second fluid from the hot source 214 to heat the condensate. Keep monitoring the temperature of the condensate, if the temperature of the condensate is still lower than the preset temperature after heating exchange between the second fluid from the hot source 214 and the condensate, the second control valve 140 is opened to direct at least part of the condensate from the feed line to the outlet 216 of the LP economizer 210. In some embodiments, at least one of the first control valve 120 and the second control valve 140 can be partially opened or fully opened to allow the condensate to achieve the preset temperature more effectively.

In some embodiments, the recirculation pump 180 is configured to pump at least one of the first fluid and the second fluid to heat the condensate, and the recirculation pump 180 has a controllable flow rate.

In some embodiments, as shown in FIG. 1, the LP evaporator 220 is configured to receive a first part of the feedwater from the outlet 216 of the LP economizer 210, the first part of the feedwater first flow into the evaporator 224 of the LP evaporator 220 through the drum 222. A pressure increasing pump 270 is configured to receive a second part of the feedwater from the outlet 216 of the LP economizer 220, the pressure increasing pump 270 may also be referred to as a boost pump. At least one of the IP evaporator 240 and the HP evaporator 260 is configured to receive the second part of the feedwater from the pressure increasing pump 270 and operate the feedwater in the HP evaporator 260 at a subcritical up to supercritical pressure range. In some embodiments, a minimum of the pressure range is equal to or above 160 bars.

In some embodiments, if the temperature of the condensate is still lower than the preset temperature when both the first control valve 120 and the second control valve 140 run with maximum flow, an additional line 150 coupled between the feed line 110 and at least one of the IP economizer 230 and the HP economizer 250 is configured to direct a third fluid to heat the condensate before entering the LP economizer 210.

Figure 2:
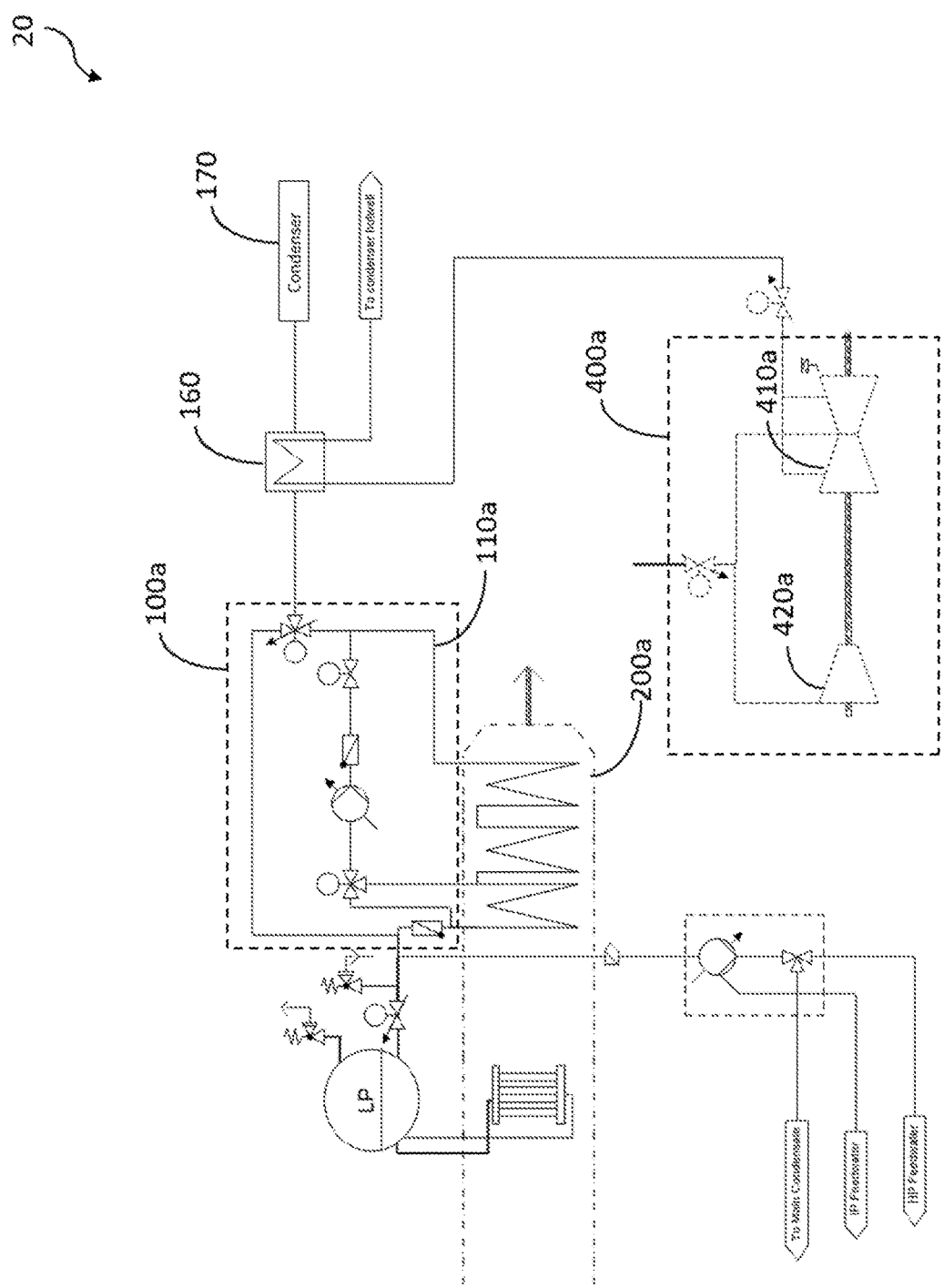
FIG. 2 is a schematic drawing of a CCPP in accordance with some embodiments of the present disclosure.

FIG. 2 shows a schematic drawing of a CCPP 20 in accordance with some embodiments of the present disclosure. A preheating system 100a, a heat recovery steam generator 200a and a steam turbine 400a are approximately the same with the preheating system 100, the heat recovery steam generator 200 and the steam turbine 400 in the embodiment of FIG. 1. The method for operating the preheating system is aforementioned, which may not repeat again herein. In the embodiment of FIG. 2, the CCPP 20 further includes a heat exchanger 160 coupled between a condenser 170 and a feed line 110a of the preheating system 100a. When the sulfur concentration of the fuel oil is high, the heat exchanger 160 is configured to direct steam extracted from the steam turbine 400a to heat the condensate. The steam turbine 400a includes a LP steam turbine 410a and a IP steam turbine 420a. In some embodiments, when the condensate requires a medium to high heating requirements, the steam in the heat exchanger 160 is extracted from the LP steam turbine 410a. In some other embodiments, when the condensate requires a high to very high heating requirements, the steam in the heat exchanger 160 is extracted from the IP steam turbine 420a and optionally the LP steam turbine 410a. In some other embodiments, the preset temperature is highly depending on plant configurations and may be not limited herein.

In some embodiment, as shown in FIG. 2, a direct steam injection (DSI) heater 190 may also be coupled between the condenser 170 and the feed line 110a to heat the condensate combined with the preheating system when the sulfur concentration of the fuel oil is extremely high.

Figure 3:
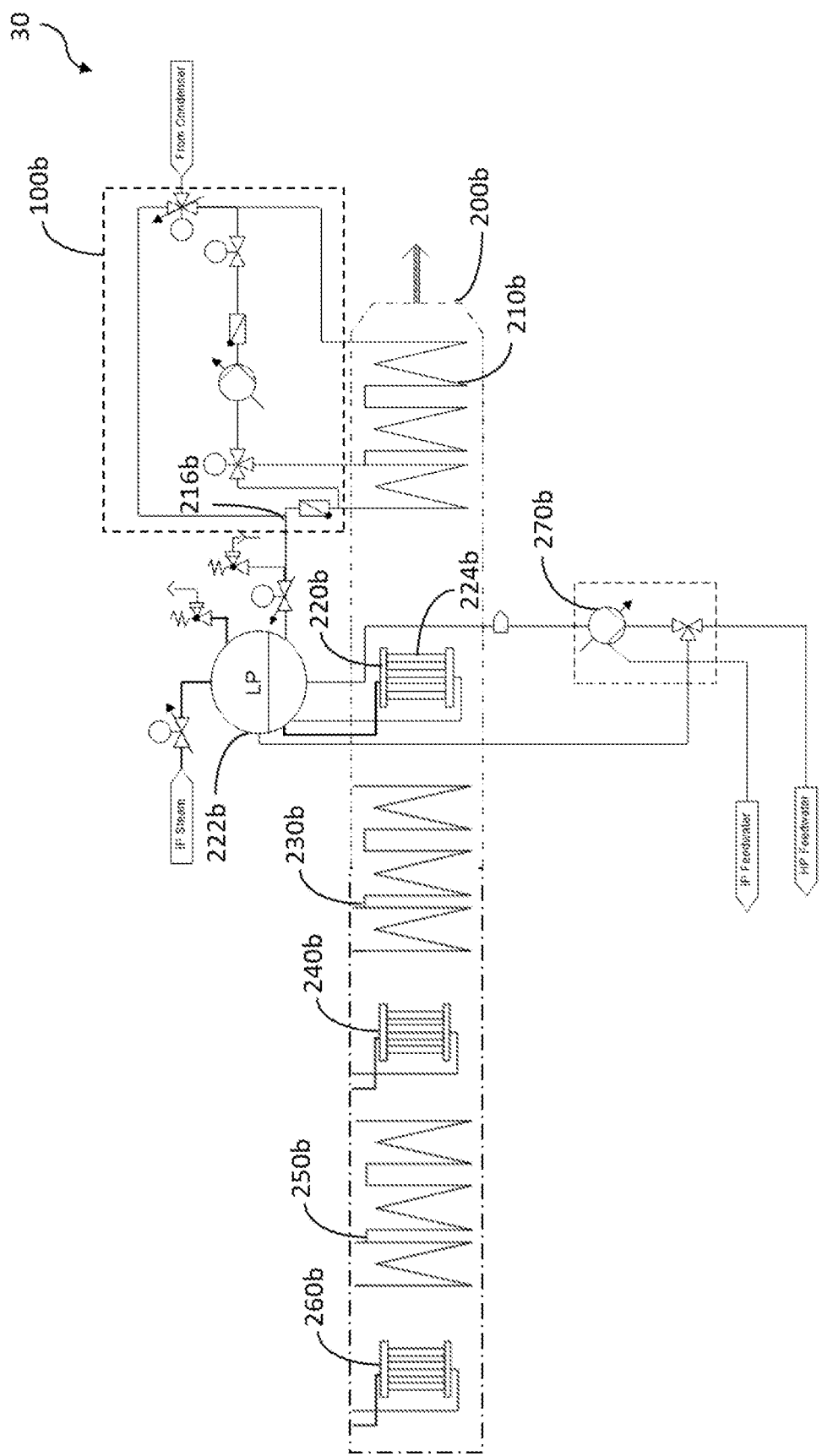
FIG. 3 is a schematic drawing of a CCPP in accordance with some embodiments of the present disclosure.

FIG. 3 shows a schematic drawing of a CCPP 30 in accordance with some embodiments of the present disclosure. A preheating system 100b and a heat recovery steam generator 200b are approximately the same with the preheating system 100 and the heat recovery steam generator 200 in the embodiment of FIG. 1. The method for operating the preheating system is aforementioned, which may not repeat again herein. In the embodiment of FIG. 3, the feedwater from an outlet 216b of a LP economizer 210b is fed to a drum 222b of a LP evaporator 220b. The drum 222b receives the feedwater and divides the feedwater into two parts. A first part of the feedwater flow into an evaporator 224b of the LP evaporator 220b, and a pressure increasing pump 270b receives a second part of the feedwater from the drum 222b. At least one of an IP evaporator 240b and a HP evaporator 260b is configured to receive the second part of the feedwater from the pressure increasing pump 270b and operate the feedwater in the HP evaporator 260b at a subcritical up to supercritical pressure range. In some embodiments, a minimum of the pressure range is equal to or above 160 bars.

In some embodiments, as shown in FIG. 3, the preheating system 100b further comprises an additional recirculation pump 182 in parallel with a recirculation pump 180b. The additional recirculation pump 182 is configured to adjust the flow rate between a first control valve 120b and a feed line 110b. For example, if the condensate need more energy to reach the preset temperature, both the recirculation pump 180b and the additional recirculation pump 182 are switched on with maximum flow to pump the hot fluid from the IP economizer 210b to the feed line 110b. In some embodiments, two or more additional recirculation pumps can be added in parallel with the recirculation pump 180b.

Figure 4:
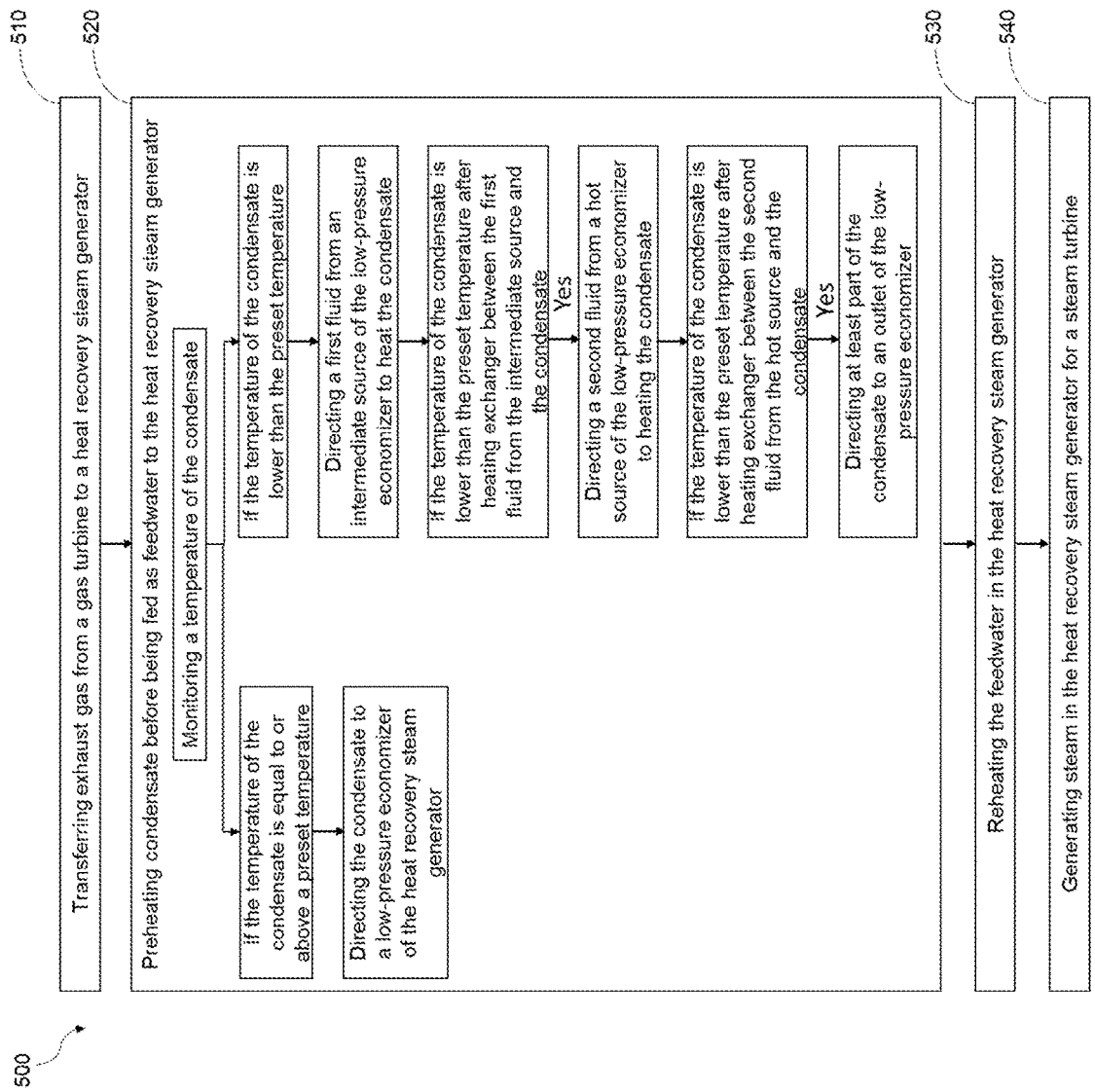
FIG. 4 is a flow chart of a method for operating a CCPP in accordance with some embodiments of the present disclosure.

The present disclosure also describes a method for operating a combined cycle power plant. Referring to FIGS. 1 and 4, the method 500 includes the following steps.

At step 510, during operation of the CCPP 10, exhaust gas from the gas turbine 300 is transferred to the heat recovery steam generator 200.

At step 520, before being fed as feedwater to the heat recovery steam generator 200, condensate is preheated by the preheating system 100.

Moreover, preheating the condensate includes keep monitoring a temperature of the condensate. If the temperature of the condensate is equal to or above the preset temperature, the condensate is directed to the LP economizer 210 of the heat recovery steam generator 200, the whole CCPP system is operated as usual. Otherwise, if the temperature of the condensate is lower than the preset temperature: firstly, the first fluid from the intermediate source 212 of the LP economizer 210 is directed to the feed line 110 to heat the condensate. Secondly if the temperature of the condensate is lower than the preset temperature after heating exchange between the first fluid from the intermediate source 212 and the condensate, the second fluid from the hot source 214 of the LP economizer 210 is directed to the feed line 110 to heat the condensate. Thirdly, if the temperature of the condensate is still lower than the preset temperature after heating exchange between the second fluid from the hot source 214 and the condensate, at least part of the condensate is directed to the outlet 216 of the LP economizer 210.

At step 530, the feedwater is reheated in the heat recovery steam generator 200 to generate steam.

At step 540, the heat recovery steam generator 200 is configured to generate for the steam turbine 400.

In some embodiments, as shown FIG. 1, step 530 includes the following steps. The first part of the feedwater from the outlet 216 of the LP economizer 210 is directly to the LP evaporator 220 and the second part of the feedwater from the outlet 216 of the LP economizer 210 is directed to the pressure increasing pump 270. Then at least one of the IP evaporator 240 and the HP evaporator 260 is configured to receive the second part of the feedwater from the pressure increasing pump 270 and operate the feedwater in the HP evaporator 260 at a subcritical up to supercritical pressure range.

In some other embodiments, as shown FIG. 3, step 530 includes the following steps. The feedwater from the outlet 216b of the LP economizer is directed to the drum 222b of the LP evaporator 220b. The first part of the feedwater from the drum 222b is directly to the LP evaporator 220b and the second part of the feedwater from the drum 222b is directed to the pressure increasing pump 270b. Then at least one of the IP evaporator 240b and the HP evaporator 260b is configured to receive the second part of the feedwater from the pressure increasing pump 270 and operate the feedwater in the HP evaporator 260b at a subcritical up to supercritical pressure range.

In some embodiments, as shown FIG. 1, switching off the low-pressure steam control valve 226 coupled between the heat recovery steam generator 200 and the LP steam turbine 410 to throttle low-pressure steam to the LP steam turbine 410 and enhance a heat exchange in the heat recovery steam generator 200. In some specified embodiments, if the temperature of the feedwater is still below the preset temperature in the HRSG cold end, switching off the intermediate-pressure steam control valve 246 coupled between the heat recovery steam generator 200 and the IP steam turbine 420 to throttle intermediate-pressure steam to the IP steam turbine 420 and enhance the heat exchange in the heat recovery steam generator 200.

In some embodiments, as shown FIG. 1, preheating the condensate further includes: directing the third fluid from at least one of the IP economizer 230 and the HP economizer 250 to heat the condensate before entering the LP economizer 210.

In some embodiments, as shown FIG. 2, preheating the condensate further includes: heating the condensate via the steam extracted from at least one of a low-pressure steam turbine 410 and an intermediate-pressure steam turbine 420.

Compared with traditional method which use a typical steam heater or an electrical heater to heat the condensate directly, the concepts of this present disclosure disclose a control method using several steps and hardware to be implemented depending on the sulfur concentration of different fuel oils. It allows a minimum required impact in efficiency and cost. Addition hardware, such as DSI heater will be implemented only for very high sulfur concentrations. This will allow to achieve lower capital cost for the CCPP.

While embodiments of the disclosure have been described herein, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

Furthermore, the skilled artisan will recognize the interchangeability of various features from different embodiments. The various features described, as well as other known equivalents for each feature, can be mixed and matched by one of ordinary skill in this art to construct additional systems and techniques in accordance with principles of this disclosure.

The invention claimed is:

1. A combined cycle power plant, comprising:
a gas turbine;
a steam turbine;
a preheating system configured to heat a condensate from the steam turbine as to generate feedwater; and
a heat recovery steam generator configured to receive exhaust gas from the gas turbine, to heat the feedwater from the preheating system and to generate steam for the steam turbine, the heat recovery steam generator comprising a low-pressure economizer and a drum type evaporator, the low-pressure economizer comprising a conduit extending between an inlet and an outlet of the low-pressure economizer, the low-pressure economizer comprising a hot source downstream from an intermediate source, and the intermediate source is disposed between the inlet and the outlet,
wherein the preheating system comprises:
a feed line configured to receive the condensate from the steam turbine and direct the feedwater to the low-pressure economizer of the heat recovery steam generator;
a first control valve having a first position and a second position, wherein a first channel of the first control valve is fluidly coupled between the intermediate source of the low-pressure economizer and the feed line when the first control valve is in the first position, a first line fluidly couples the first channel to the intermediate source between the inlet and the outlet, a second channel of the first control valve is fluidly coupled between the hot source of the low-pressure economizer and the feed line when the first control valve is in the second position, a second line fluidly couples the second channel to the hot source, and the low-pressure economizer is separately coupled to the feed line, the first line, and the second line; and
a bypass comprising a second control valve and coupled between the outlet of the low-pressure economizer or the drum type evaporator and the feed line, wherein:
if the temperature of the condensate is equal to or above a preset temperature, both the first control valve and the second control valve are switched off; or
if the temperature of the condensate is lower than the preset temperature:
the first control valve is turned to the first position to direct a first fluid from the intermediate source to heat the condensate; and
if the temperature of the condensate is lower than the preset temperature after heating exchange between the first fluid from the intermediate source and the condensate:

the first control valve is turned to the second position to direct a second fluid from the hot source to heat the condensate; and if the temperature of the condensate is lower than the preset temperature after heating exchange between the second fluid from the hot source and the condensate, the second control valve is opened to direct at least part of the condensate from the feed line to the outlet of the low-pressure economizer.

2. The combined cycle power plant of claim 1, wherein the preheating system further comprises a recirculation pump coupled between the first control valve and the feed line, the recirculation pump is configured to pump at least one of the first fluid and the second fluid to heat the condensate, wherein the recirculation pump has a controllable flow rate.

3. The combined cycle power plant of claim 2, wherein the preheating system further comprises at least one additional recirculation pump in parallel with the recirculation pump, the at least one additional recirculation pump is configured to adjust the flow rate between the first control valve and the feed line.

4. The combined cycle power plant of claim 1, further comprising a direct steam injection heater coupled between the condenser and the feed line to heat the condensate.

5. The combined cycle power plant of claim 1, further comprising:

the drum type evaporator configured to receive a first part of the feedwater from the outlet of the low-pressure economizer;

a pressure increasing pump configured to receive a second part of the feedwater from the outlet of the low-pressure economizer; and at least one of an intermediate-pressure evaporator and a high-pressure evaporator configured to receive the second part of the feedwater from the pressure increasing pump and operate the feedwater in the high-pressure evaporator at a subcritical up to supercritical pressure range.

6. The combined cycle power plant of claim 1, further comprising:

a drum of the drum type evaporator configured to receive the feedwater from the outlet of the low-pressure economizer;

a pressure increasing pump configured to receive at least part of the feedwater from the drum; and at least one of an intermediate-pressure evaporator and a high-pressure evaporator configured to receive the at least part of the feedwater from the pressure increasing pump and operate the feedwater in the high-pressure evaporator at a subcritical up to supercritical pressure range.

7. The combined cycle power plant of claim 1, wherein the heat recovery steam generator further comprises at least one of an intermediate-pressure economizer and a high-pressure economizer.

8. The combined cycle power plant of claim 7, wherein the heat recovery steam generator further comprises an additional line configured to direct a third fluid from at least one of the intermediate-pressure economizer and the high-pressure economizer to heat the condensate before entering the low-pressure economizer.

9. The combined cycle power plant of claim 1, further comprising a heat exchanger configured to direct steam extracted from the steam turbine to heat the condensate, wherein the steam turbine comprises at least one of a low-pressure steam turbine and an intermediate-pressure steam turbine.

10. The combined cycle power plant of claim 1, wherein the gas turbine generates exhaust gas via a fuel oil, and a sulfur concentration of the fuel oil is from 0 ppm to 13000 ppm.

11. The system of claim 1, wherein the bypass is configured to bypass the first control valve coupled to the hot source and the intermediate source.

12. A preheating system for a heat recovery steam generator comprising a low-pressure economizer and a drum type evaporator, the preheating system comprising:

a feed line configured to receive condensate from a steam turbine and direct feedwater to the low-pressure economizer of the heat recovery steam generator, the low-pressure economizer comprising a conduit extending between an inlet and an outlet of the low-pressure economizer, the low-pressure economizer comprising a hot source downstream from an intermediate source, and the intermediate source is disposed between the inlet and the outlet;

a first control valve having a first position and a second position, wherein a first channel of the first control valve is fluidly coupled between the intermediate source of the low-pressure economizer and the feed line in when the first control valve is in the first position, a first line fluidly couples the first channel to the intermediate source between the inlet and the outlet, a second channel of the first control valve is fluidly coupled between the hot source of the low-pressure economizer and the feed line when the first control valve is in the second position, a second line fluidly couples the second channel to the hot source, and the low-pressure economizer is separately coupled to the feed line, the first line, and the second line; and a bypass comprising a second control valve and coupled between the outlet of the low-pressure economizer or the drum type evaporator and the feed line, wherein:

if the temperature of the condensate is equal to or above a preset temperature, both the first control valve and the second control valve are switched off; or if the temperature of the condensate is lower than the preset temperature:

the first control valve is turned to the first position to direct a first fluid from the intermediate source to heat the condensate; and if the temperature of the condensate is lower than the preset temperature after heating exchange between the first fluid from the intermediate source and the condensate:

the first control valve is turned to the second position to direct a second fluid from the hot source to heat the condensate; and if the temperature of the condensate is lower than the preset temperature after heating exchange between the second fluid from the hot source and the condensate, the second control valve is opened to direct at least part of the condensate from the feed line to the outlet of the low-pressure economizer.

13. The preheating system of claim 12, wherein the preset temperature is above at least one of a water dew point or an acid dew point.

14. The system of claim 12, wherein the bypass is configured to bypass the first control valve coupled to the hot source and the intermediate source.

15. A system, comprising:
a preheating system, comprising:
- a feed line configured to receive a condensate from a steam turbine and direct a feedwater to a low-pressure economizer of a heat recovery steam generator, wherein the low-pressure economizer comprises a conduit extending between an inlet and an outlet of the low-pressure economizer, the low-pressure economizer comprises a hot source downstream from an intermediate source, and the intermediate source is disposed between the inlet and the outlet;
- a first control valve having a first position and a second position, wherein a first channel of the first control valve is configured to be fluidly coupled between the intermediate source of the low-pressure economizer and the feed line when the first control valve is in the first position, a first line is configured to fluidly couple the first channel to the intermediate source between the inlet and the outlet, a second channel of the first control valve is configured to be fluidly coupled between the hot source of the low-pressure economizer and the feed line when the first control valve is in the second position, a second line is configured to fluidly couple the second channel to the hot source, and wherein the feed line, the first line, and the second line are configured to be separately coupled to the low-pressure economizer; and
- a bypass comprising a second control valve, wherein the bypass is configured to be coupled between the outlet of the low-pressure economizer or a drum type evaporator of the heat recovery steam generator and the feed line, wherein:
  - if the temperature of the condensate is equal to or above a preset temperature, both the first control valve and the second control valve are switched off; or
  - if the temperature of the condensate is lower than the preset temperature:
  - the first control valve is turned to the first position to direct a first fluid from the intermediate source to heat the condensate; and
  - if the temperature of the condensate is lower than the preset temperature after heating exchange between the first fluid from the intermediate source and the condensate:
  - the first control valve is turned to the second position to direct a second fluid from the hot source to heat the condensate; and
  - if the temperature of the condensate is lower than the preset temperature after heating exchange between the second fluid from the hot source and the condensate, the second control valve is opened to direct at least part of the condensate from the feed line to the outlet of the low-pressure economizer.

16. The system of claim 15, wherein the bypass is configured to bypass both the hot source and the intermediate source.

17. The system of claim 15, comprising the heat recovery steam generator.

18. The system of claim 15, comprising the steam turbine.